March 3, 1959 — L. W. STAPLES ET AL — 2,875,818
SPRING ASSEMBLY

Filed April 25, 1957 — 5 Sheets-Sheet 1

INVENTORS
LYNN W. STAPLES
RAY D. STROUT
BY
ATTORNEYS

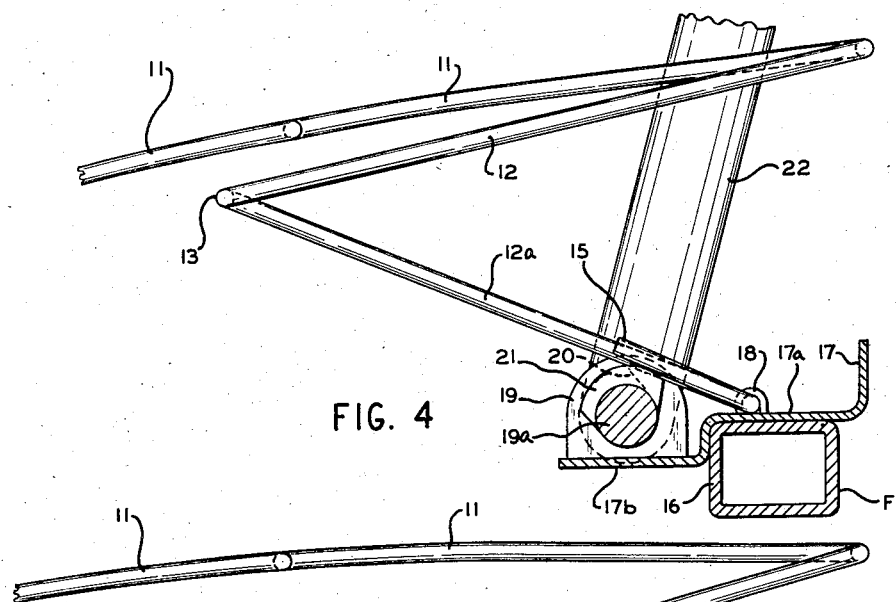
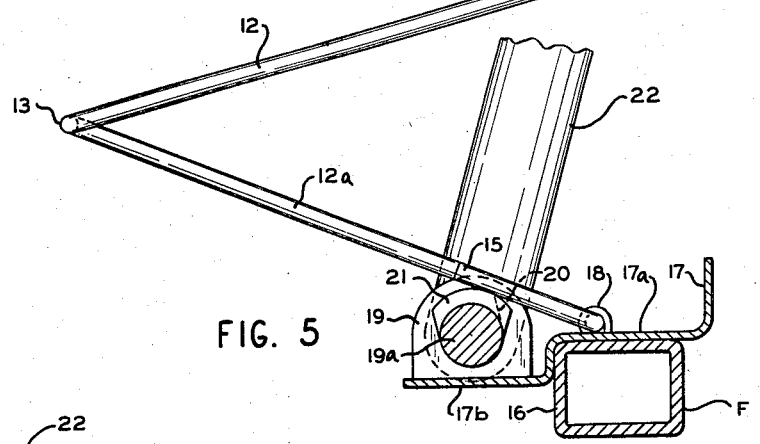
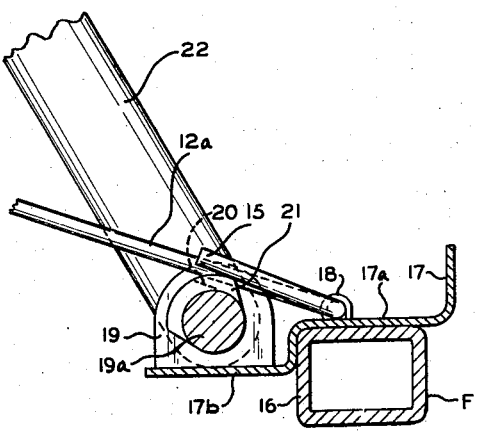
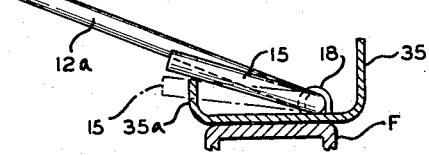

March 3, 1959  L. W. STAPLES ET AL  2,875,818

SPRING ASSEMBLY

Filed April 25, 1957  5 Sheets-Sheet 3

*INVENTORS*
LYNN W. STAPLES
RAY D. STROUT
BY
*Karman & Karman*
ATTORNEYS

March 3, 1959     L. W. STAPLES ET AL     2,875,818

SPRING ASSEMBLY

Filed April 25, 1957     5 Sheets-Sheet 4

*INVENTORS*
LYNN W. STAPLES
RAY D. STROUT
BY
*Farman & Farman*

ATTORNEYS

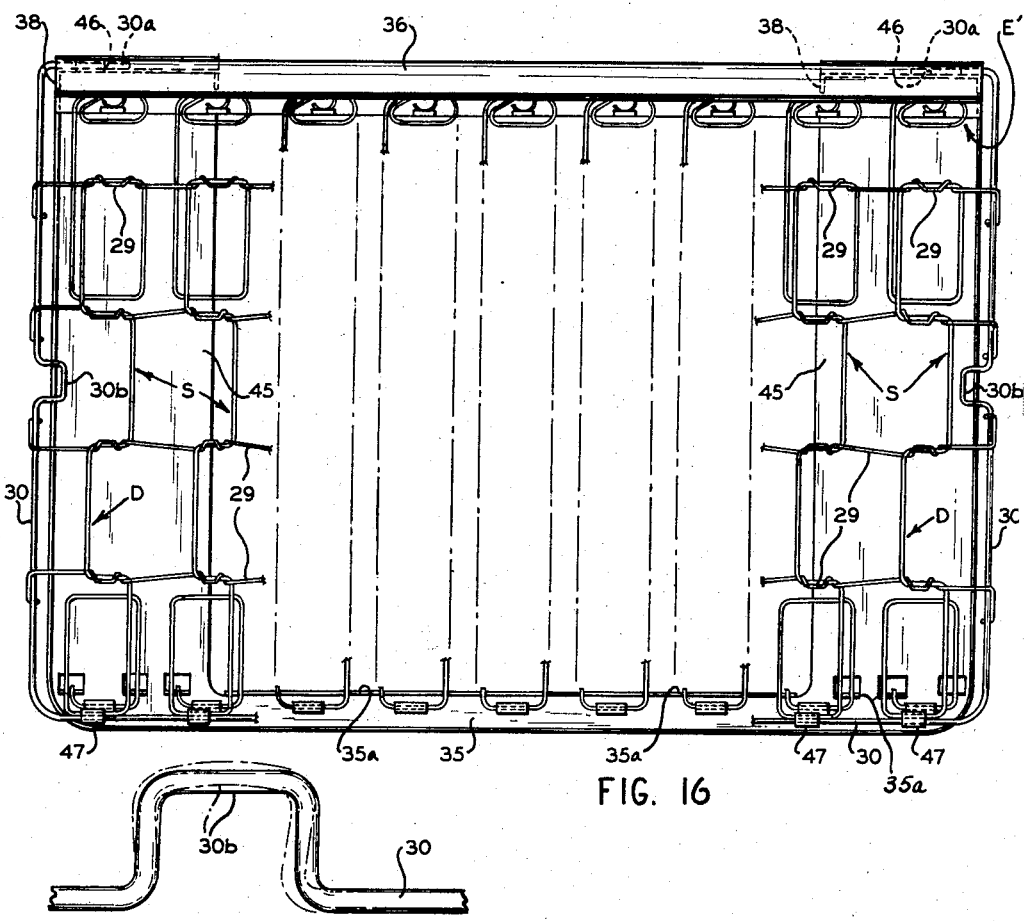
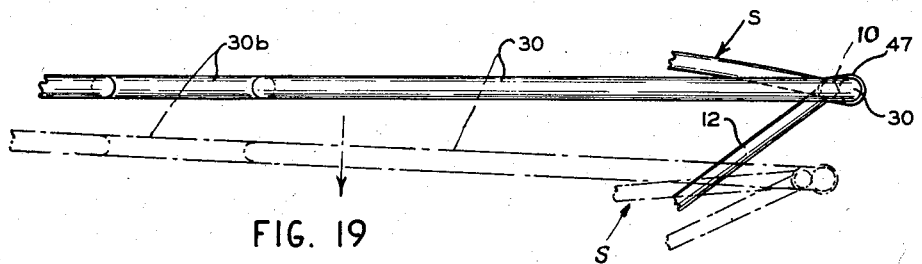
FIG. 16
FIG. 18
FIG. 19
INVENTORS
LYNN W. STAPLES
RAY D. STROUT
BY
ATTORNEYS

United States Patent Office 2,875,818
Patented Mar. 3, 1959

2,875,818

SPRING ASSEMBLY

Lynn W. Staples and Raymond D. Strout, Saginaw, Mich., assignors to Saginaw Wire Products, Inc., Saginaw, Mich., a corporation of Michigan Application April 25, 1957, Serial No. 655,143

8 Claims. (Cl. 155—179)

This invention relates to formed wire spring assemblies of generally sinuous design such as are conventionally used in vehicle seat constructions and the like and more particularly to a multiple stage spring assembly which provides optimum seating characteristics over a wide range of applied loads.

It is conventional practice in the automotive and furniture industries today to design sinuous type spring-incorporating seats and backs for the person of average weight. A person weighing about 150–160 pounds will be most comfortably accommodated by present day seat and back constructions because the seat will assume a predetermined optimum contour under load enabling such a person to sit in maximum comfort. An occupant weighing under 135 pounds, however, as does the average woman and child, will not be as comfortably supported because the springs will not assume a contour under load providing the most desirable distributed pressures on the load. Under the weight of a relatively light person the springs will not assume a contour of appropriate shape and depth and the pressures transmitted to some portions of the hips and thighs will be greater than is desirable for maximum comfort. Similarly a man weighing in the neighborhood of 200 pounds will depress the springs beyond the desired contour and will not be able to ride in maximum comfort. These differences in spring resistance at various points over the lengths of the springs, from what might be termed the "comfort resistances," result in undue fatigue on trips of any length when an occupant weighing more or less than the load the springs were designed for must ride for several hours or more.

It is a prime object of the instant invention to design a multiple stage spring assembly incorporating springs having stages of depression so prearranged that the springs provide substantially the same optimum comfort for an occupant weighing 125 pounds as for one weighing 200 pounds.

Another object of the invention is to design a multiple stage, sinuous type spring assembly incorporating a spring so designed that sections of the spring are progressively blocked out of operation as the load becomes heavier and certain torsion bars and spacer bars are prevented from freely deflecting with the load.

A further object of the invention is to design a sinuous type spring assuming a predetermined contour under a given load which can be readily varied to suit particular automotive manufacturers without changing the design of the spring at all.

Another object of the invention is to design a spring of the type described which can be preloaded as desired to provide for occupants in different weight ranges. For example, the instant invention contemplates the use in delivery truck seats (which would ordinarily be driven by heavier persons) of a spring of the same design as is used in passenger vehicles. The introduction of the instant spring assembly will make it possible to order an automobile having seat springs which are particularly geared to the weights of the persons who normally ride in the car. The springs used will all be of the same deck or platform design but will vary in the degree of preloading of the stages.

Still a further object of the invention is to design a sinuous type spring for incorporation in a seat assembly which can be very simply adjusted while installed in place in the vehicle to vary the preloading of the various stages to suit the particular occupants riding in the vehicle at a particular time.

Another object of the invention is to design a multiple stage spring assembly which by adjustment of the preloaded stages described permits shifting of the various portions of the contour forwardly or rearwardly, and variance of the depth and shape of the contour to suit the individual.

A further object of the invention is to design a multiple stage spring which can maintain an optimum contour over a broad load range without employing costly auxiliary brace elements such as helper or booster rods or springs.

Another object of the invention is to design a sinuous type spring assembly which can support a wide range of applied loads and give them a "ride" or "feel" of great comfort without a great variance in deflection over the range.

A further object of the invention is to design a spring seat or back assembly of the type described which eliminates the chafing action at the rear portion of the seat heretofore encountered in conventional spring assemblies on rides of several hours duration.

Still another object of the invention is to design a multiple stage spring assembly having the foregoing advantages and attributes which can be formed of a minimum weight of wire on known wire bending machines of simple design.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Figure 3 is an enlarged, fragmentary, side elevational view illustrating the manner in which the supporting end sections of the spring may be preloaded prior to application of the load.

Figure 4 is a similar view showing a spring which is preloaded as in Figure 3 in an advanced stage of depression or deflection.

Figure 5 is a similar view illustrating the manner in which preloading of the angular lower section of the fishmouth portion of the end sections of the springs is accomplished.

Figure 16 of a top plan view of a modified multiple stage spring assembly, the diagrammatic lines being employed in the interest of clarity to indicate additional springs of identical form.

Figure 17 is an enlarged, fragmentary side elevational view of the front end supporting section of each spring in the assembly illustrating how the preloading in this case is accomplished by forming the spring so that the frame preloads it on installation.

Figure 18 is an enlarged, fragmentary, top plan view of one of the side sections of the border wire, the diagrammatic lines illustrating a deformed position of the loop in the border wire.

Figure 19 is an enlarged, fragmentary, end elevational view, the diagrammatic lines illustrating the deflected position of a spring and the border wire.

Figure 2:
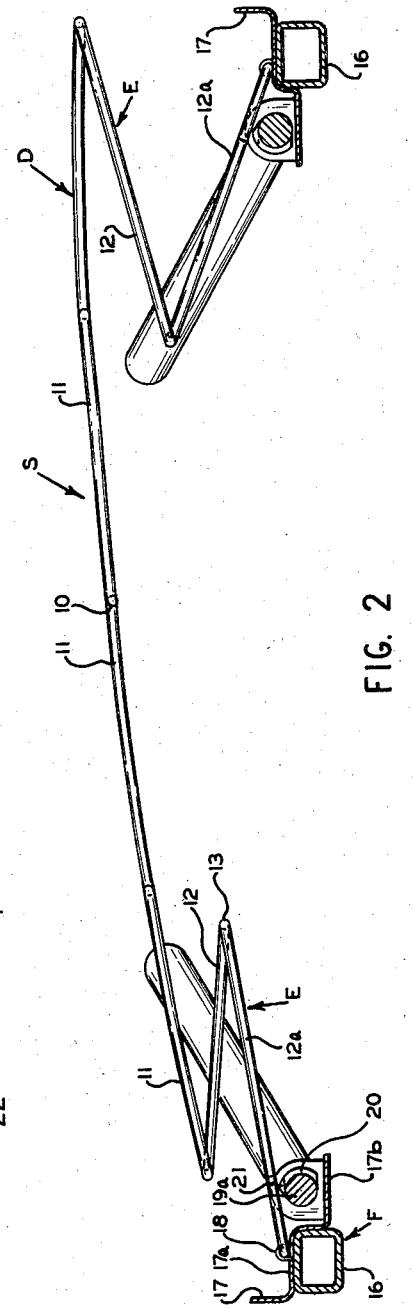
Figure 2 is a side elevational view thereof, a spring being depicted in a condition in which the supporting end sections are not preloaded.
Figure 7:
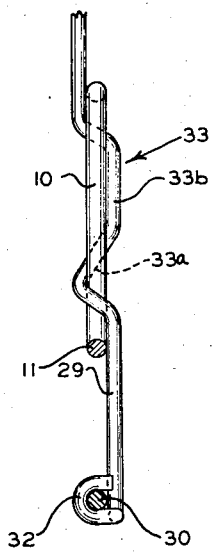
Figure 7 is an end elevational view thereof.

Referring now more particularly to the accompanying drawings in which we have shown preferred embodiments of the invention a letter S indicates a spring which is formed in accordance with the invention in a deck portion D and attachment end supporting sections E. It will be seen that the spring which is shown mounted in position on a vehicle seat frame F is of sinuous design and has torsion bars 10 of varying length and spacer bars 11 of uniform length. The length of the spacer bars 11 is relatively great in comparison to the length of any torsion bar 10 and for proper comfort is maintained at least twice as long as any torsion bar. The length of the torsion bars 10 varies in accordance with the distributed load that a particular portion of the spring is to carry and the contour which it is desired that the spring assume for maximum comfort. The unloaded contour of the deck or platform portion D is illustrated in Figure 2.

The ends E of the spring comprise angularly disposed convergent bars 12 and 12a joined by lateral connecting bars 13 as usual. The lower bars 12a are formed with lateral connection bars 14 having terminal ends 15 bent generally parallel to and in the plane of the lower bars 12a. The attachment ends E of the spring may be secured to the frame F in any appropriate manner and as will be later clear the ends 15 need not necessarily be parallel to nor in the plane of bars 12a.

For the purpose of convenience of illustration a vehicle seat frame is shown which comprises a tubular base element 16 on which is welded a plate 17 at each side. The seat depicted in Figures 1–5 is so constructed that various portions of the springs can be preloaded while the springs are installed in position, however, it is to be understood that the springs may be preloaded in advance of installation to provide a desired contour range for occupants of varying weight and such an assembly could as easily have been shown. Tunnels 18 on the upper steps 17a of the pressed plates 17 freely accommodate the lowermost lateral bar 14 as shown and these tunnels 18 may be struck from the plate 17 and later pressed down over the torsion bars 14 to secure the spring in place. While the spring is prevented from any material degree of lateral shifting and from vertical displacement by the tunnels, the torsion bars 14 will be pivotal or rockable therein.

Journaled in bearings 19 provided on the lower steps 17b of each of the plates 17 is a shaft 19a which has lugs 20 and 21 extending from its peripheral surface. These lugs 20 and 21 are positioned under each of the bars 12a and 15 respectively of each spring and plainly when the handle 22 which is pinned to the shaft 19a as at 23 is rotated in a counterclockwise direction, these lugs may be brought up into engagement with the bars 12a and 15 of the spring. The lugs 20 and 21 are shown as free of the sections 12 and 15 of the spring in Figure 2 and Figures 3–5 are employed to show various preloaded conditions of the springs.

It will be seen that the lugs 21 lead the lugs 20 in the sense that they are disposed angularly upwardly of the lugs 20 and come into engagement with the ends 15 prior to the time the lugs 20 engage the bars 12a. The purpose of this construction which permits the multiple staging referred to will later become apparent.

It is to be understood that we employ some suitable means for maintaining the handle 22 in adjusted position and this means may comprise a ratchet wheel 24 on the shaft 19a which is ordinarily restrained from rotation in a clockwise direction by a pawl 25 pivoted on a pin 26 which has a handle 27, a bearing 28 on the frame F supporting pin 26.

Transversely disposed tie wires 29 are employed to join the various springs in the seat assembly for operation in unison and the tire wires also connect the springs to a conventional continuous border wire 30 which extends around the sides and ends of the assembly at the level of the deck portions of the springs. The wires 29 join the torsion bars 10 of the deck sections D of the springs and preferably extend the full length of the seat assembly from the border wire 30 at one side to the section of the border wire 30 at the other side. (See Figure 16.) They are formed so that they can be conveniently pivoted into locking position in a very simple and easy manner to avoid much of the labor concerned with previous methods of assembly.

Figure 6:
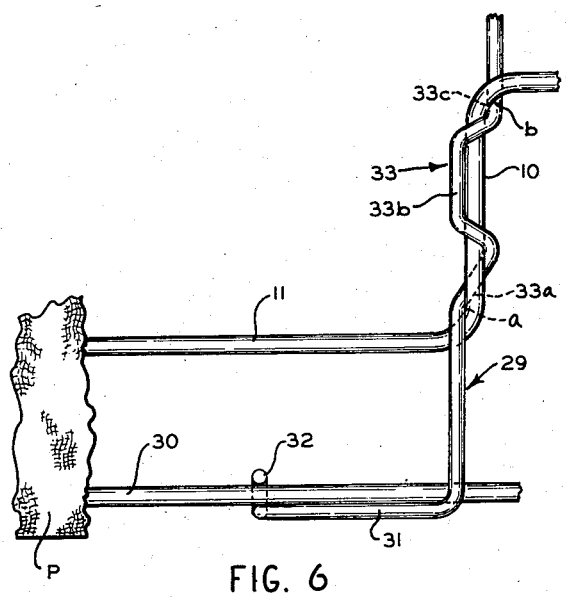
Figure 6 is an enlarged, top plan view illustrating the tie-wire shown in Figure 1 for connecting a number of the springs for operation in unison.

The tie wires 29 at each end thereof are formed with a transverse section 31 having a depending hook 32 at its terminal end adapted to hook under the border wire 30 at the side of the seat assembly. These end sections 31 are in the plane of the wires 29 which is defined as the plane of the portions between the springs and between the end springs and border wires 30. These latter portions are coincident with the pivotal axis of each wire 29. At uniformly spaced intervals over the length of the tie wires 29 compound loops 33 are formed which are of particular length relative to the particular torsion bars 10 they are to join. Each torsion bar 10 will, of course, be substantially in transverse alignment with the corresponding torsion bars of the other identical springs S which are mounted in uniformly spaced apart relation on the frame F. The loops need not, of course, be uniformly spaced if it is desired to variably space the springs S, however, for purposes of illustration the springs S will be assumed to be of identical configuration and uniformly spaced. Each loop portion 33 comprises a curvilinear portion 33a which extends from the axis of the wire 29 downwardly and transversely in a loop so as to pass under and around one end of the torsion bar 10, a mid-portion 33b of linear configuration which is on the same side of the particular torsion bar 10 as the axial portions of the wire when the tie wire is rotated to locked position (see Figure 6) and a return curvilinear portion 33c which loops under the torsion bar 10 at its opposite end and extends around and up to the connecting portion of the wire once again.

When rotated to locked position the loops 33 very effectively are secured in locked position once the hook ends 32 are brought up under the border wires 30. The sections 33b of each loop 33 are prevented from sliding lengthwise along the torsion bars 10 because of the engagement of the portions 33a and 33b with the ends of the torsion bars 10 at points "a" and "b" and the engagement of the hooks 32 under the border wire 30 prevents clockwise rotation of the wires to unlocked position. The engagement also prevents pivoting or rotation of the deck portions of the springs and tends to prevent their tipping and lateral shifting.

Figure 8:
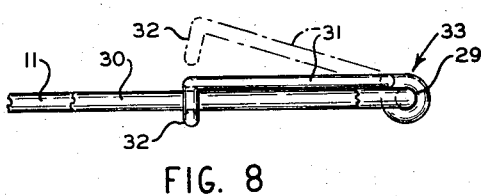
Figure 8 is a side elevational view thereof, the broken lines illustrating the manner in which the tie wire is applied.

In the assembly of the tie wires 29 the sections 33b of each wire 29 are initially disposed slightly below the torsion bars 10 (Figure 6) which disposes the portions 31 of the tie wires to the right. Each tie wire 29 is then rotated in a counterclockwise direction about the axis of the wire through about 180° (Figure 8) which revolves the portions 33b up and around the torsion bars 10 to a position behind them or on the left side of them (Figure 6), and the ends 32 are thence hooked under the border wires 30 to secure the tie wire in position.

Figure 9:
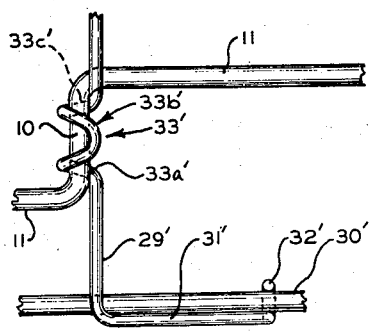
Figure 9 is an enlarged view of the tie-wire shown in Figure 1 which is used to join the shorter torsion bars of the springs.
Figure 10:
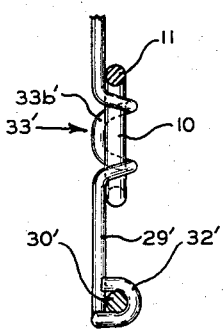
Figure 10 is an end elevational view thereof.
Figure 11:
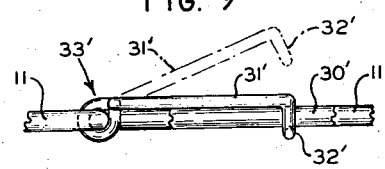
Figure 11 is a side elevational view thereof.

In Figures 9, 10, and 11 a tie wire 29' is shown which is employed to join the shorter central torsion bars 10 in the deck sections of the springs and as before includes leg portions 31' terminating in hooks 32' for engaging under the border wire 30' at each side of the seat assembly. This tie wire 29' also has compound loops 33' formed at spaced intervals to lock around the torsion bars 10 of the springs which as before include sections 33a', 33b' and 33c'. The latter sections differ in that each section 33b' instead of being linear, is bent inwardly into arcuate shape so that it is disposed over the torsion bar 10 when the tie wire 29' is in locked position as shown in Figure 9.

The tie wire 29' is assembled in similar manner except that the section 33b' is initially disposed on the right side of and below the torsion 10 (as viewed in Figure 9) and is then rotated in a clockwise direction about the axis of the tie wire through slightly more than 180° until the projection 33b' is disposed on top of the torsion bar 10 as shown. In the cases of both tie wires 29 and 29' the leg portions 31 or 31' must be displaced outwardly a short distance so that the hooks 32 or 32' clear the border wire 30 during rotation of the tie wires. Once the hook portions 32 or 32' are below the border wires 30, the sections 31 or 31' are allowed to snap inwardly and the hook portions 32 then bear against the under portions of the border wire 30.

Figure 1:
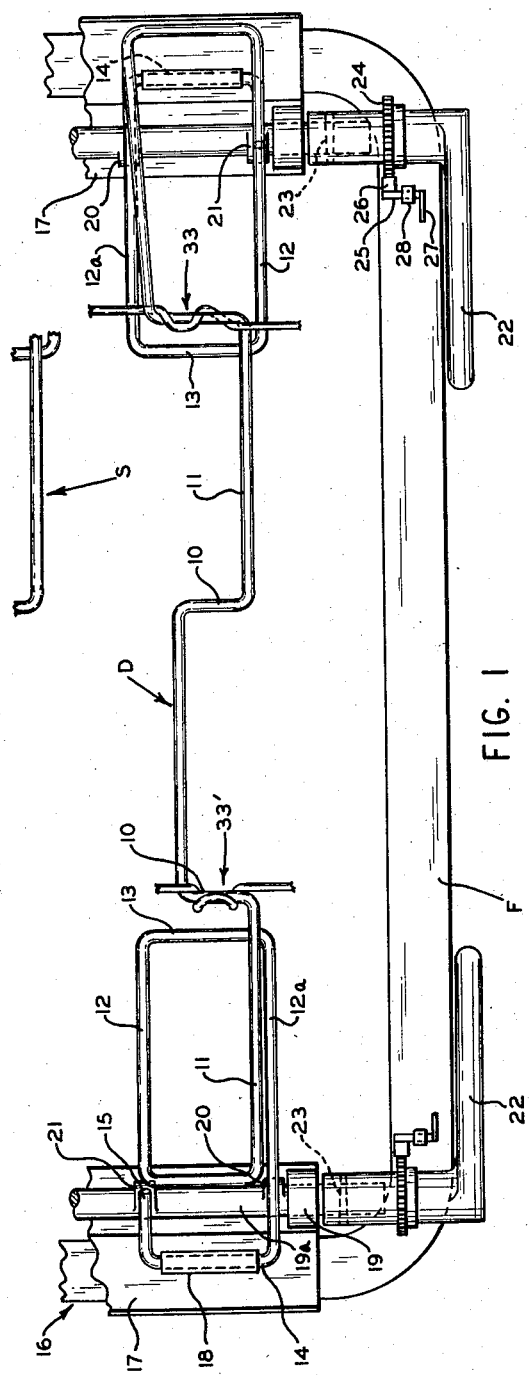
Figure 1 is a fragmentary, top plan view showing multiple stage springs secured in position between the front and rear rails of a seat assembly.

In operation the deck portions of the springs shown in Figures 1 and 2 are designed to assume a predetermined contour under the load of a person of average weight and will exert pressures on the occupant in direct proportion to the load transmitted by the various portions of the occupant's body in engagement with the spring. Of course, the usual padding and fabric P is provided over the upper surfaces of the springs, however, the resistive pressures of the springs are, of course, transmitted directly to the thighs and hips of the occupant. As the distributed load is applied to the deck portion of the spring, both the deck portion and the attachment ends E are depressed.

Initially, in Figures 1 and 2 in which the lugs 21 are out of engagement with ends 15 in what may be termed a first stage of depression, when the deflection is minor, the springs will have a very low rate or very soft feel. The deck or platform portion D of each spring will be supported only by its end (and usually longest) torsion bars 10 and the end supporting sections E will be operating as hinged supports because the bars 14 are free to pivot. With the end torsion bars of the deck portion D acting as fulcrum supports for the deck area the latter is least stiff as a beam and the moment arms connecting the load with the torsion bars are long. A load which affects the springs shown in Figures 1 and 2 in the manner indicated might be that applied by a small child.

When a heavier load is applied, the springs are depressed until the terminal ends 15 bear on the lugs 21 and the bars 14 are restrained so that they resist further depression of each spring by opposing the tendency of the load to twist them. In other words, when the depression enters what may be termed stage 2 of the deflection or depression the bars 14 operate as torsion bars to resist the applied load and the spring stiffens considerably. Usually an occupant weighing in the neighborhood of 120 to 125 pounds will depress the springs sufficiently so that they enter this stage of depression. The deck portion D of each spring directly bearing the load will be deflected sufficiently to provide contour pressures of maximum comfort. If a person of average weight (in the neighborhood of 150 to 160 pounds) is seated on the spring the deflection may be sufficient so that the end spacer bar 11 at the left end of spring S in Figure 1 is depressed sufficiently to bear on the bar 13 underneath and the tie wire 29 at the right end of the spring is depressed sufficiently to bear on the bar 13 underneath it. At this point the spring may be said to be in a third stage of deflection. The deck portion or platform section D of the spring is rendered more stiff as a beam since its points of support on the attachment end sections is now closer to the area of main load distribution. The end supporting sections E of the springs are also more resistant to deflection under such a load because the bars 12 and 13 are blocked out of operation so to speak and do not function as deflectable members. The contour assumed by the deck portion of each spring will not be sufficiently different to affect the comfort of the person seated on the springs, however, even though the springs are now considerably stiffer.

If a person weighing in the neighborhood of 200 pounds is seated on the springs the deflection may depress the springs sufficiently so that the bars 12a come into engagement with the lugs 20 which has the effect, of course, of considerably increasing the stiffness of the attachment ends E of each spring because the torsion bars 14 are in effect cut out or blocked out and will not operate to torsionally resist the load. At this point the springs may be said to be in a fourth stage of deflection. The contour assumed by the deck portion of each spring under the load of the person of heavier weight will not, however, be very greatly different from that previously assumed in the cases of occupants who are considerably lighter even though the spring is still stiffer than previously. Over the range of weights then the contour built into the spring for maximum comfort will not greatly change.

In addition the points at which the various stages of deflection take place can be varied to suit different occupants without changing the design of the spring at all. For instance, in Figure 3 the ends 15 of a spring are preloaded in the sense that a pretwist is applied to each torsion bar 14 which causes each torsion bar 14 to be bent up from a position in normal alignment with the bar 12a to the position in which is shown in Figure 3. This is accomplished by adjusting the shaft 19a so that the lugs 20 are moved upwardly into initial bearing engagement with the end portions 15 of the spring. It may also be accomplished by providing a frame member such as shown at 35 in Figure 17 having a section 35a above the tunnel 18. If the end 15 of the spring is normally (in unstressed position) below bar 12a as illustrated by the broken lines then, when the spring is mounted in position as illustrated by the unbroken lines, the end 15 will be preloaded. If the ends 15 are preloaded by the frame in this manner upon installation, as will normally be the case, the first stage of depression previously mentioned is, of course, eliminated and the spring is from the outset in stage 2. Most seat assemblies will be preloaded in this manner. With the assembly illustrated in Figure 3 the adjustment of the spring ends 15 and frame relatively can be made while the springs are installed in the seat. The pawl 26, which can be simply released by hand, will hold the shaft 19a in adjusted position. Of course, the deck section assumes a predetermined contour under load which is built into the spring by providing torsion bars 10 of varied length in accordance with the contour desired. If particular manufacturers desire to flatten or increase the depth of the contour to suit their individual specifications, as is frequently the case, the desired results can be obtained by preloading of the ends 15 as described. The adjustment of contour is usually a fine adjustment to find the contour which a particular manufacturer feels is most comfortable. If major changes are required usually the length of the torsion bars in the deck section D will be varied, however, such changes are, of course, more in the nature of changes in the design of the spring. With a unit such as shown in Figures 1 and 2 a manufacturer can quickly find the contour he desires to provide over the range of loads the seat is to carry and can determine the points (loads) at which he chooses to have the spring enter the various stages of deflection. He can then form springs as shown in Figure 17 which are preloaded to the same degree when assembled and provide the contour desired without changing the design of the spring at all.

The preloading of the ends 15 of the spring as in Figure 3 also, of course, changes the point in the deflection at which the bars 12a will engage the lugs 20 on shaft 19a since lugs 20 are mounted on the same shaft. In Figure 4 the spring is shown under load and it will be observed that the bar 12a is just about to engage the lug 20. Initially the end 15 was preloaded in this instance to a considerable degree and the entry of stage three of the deflection was thereby postponed. The spring is shown in stage three of the deflection and the application of a slightly greater load would cause the bar 12a to engage the lug 20 and the spring would thereby enter stage four.

In certain instances where heavy loads are to be normally borne by the springs it is desirable to preload both the ends 15 and bars 12a as shown in Figure 5. When this is done, the spring is initially in what has been described as stage four of the depression because the ends 15 and bars 14 are blocked out by engagement of the bars 12a with lugs 20. The bars 12a in this stage function as a beam to resist the load and the preloaded ends 15 operate only to relieve the load on bars 12a. The bars 14 do not operate to torsionally resist the load so the rate of the spring is immediately much higher. The tie wires 29 are depressed into engagement with the bars 12 in a later rather than an earlier stage with this arrangement. The same result can be accomplished with frame members such as shown at 35 in Figure 17, of course, if the spring is formed so that bars 12a are initially parallel with the ends 15 in Figure 17. When such a spring is installed then the bars 12a as well as the ends 15 will be preloaded because the flange 35a will press them upwardly beyond their normal position. While in Figures 3–5 we have shown but one end of a spring S, it is to be understood that the other end of the spring assembly is identical and performs in the same way. In each case the preloading alters the angularity of the bars 12 and 12a, of course, and when portions of the spring are blocked out, the effective moment arms to the applied load are changed in length. Control of the contour is accomplished further by simply varying the angularity of bars 12 and 12a in the forming operation.

By preloading the spring in the various ways indicated, we introduce opposing moments to the load produced bending moments in the deck or platform section which when properly introduced counteract the forces of the load and permit the maintanence of an optimum contour over a wide load range. The system described provides a control of the contour assumed under load without any material change in the design of the spring. The same spring can be preloaded and/or arranged with respect to supporting frame elements to provide a relatively flat or relatively concave contour over a range of loads.

Figure 12:
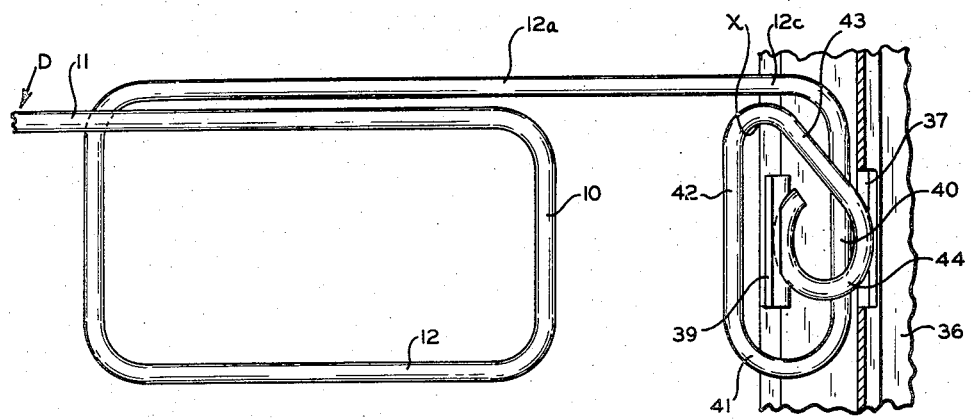
Figure 12 is an enlarged, top plan view of a modified multiple stage spring showing only the rear end thereof.
Figure 13:
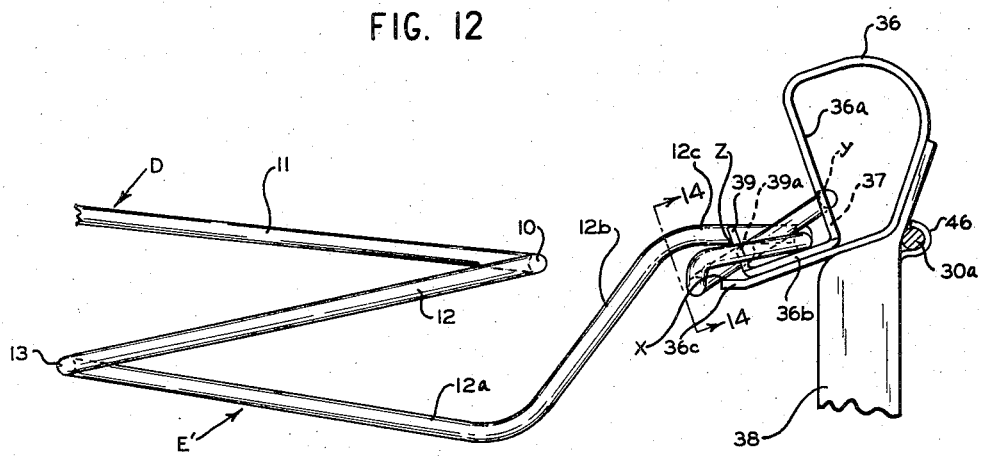
Figure 13 is a side elevational view thereof.
Figure 15:
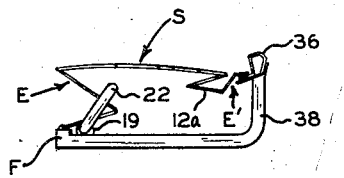
Figure 15 is a reduced, side elevational, diagrammatic view of the modified spring illustrated in Figures 12-14.

In Figures 12–15 we have shown a spring with a front supporting end section formed as in Figures 1 and 2 and a rear supporting end section E′ formed differently (see Figure 15). In automobile seats difficulty is encountered with the portion of the buttocks supported at the rear edge of the seat continuously rubbing. This chafing action which is uncomfortable over a period of time occurs because the connection of the springs in the latest seat assemblies is made, for purposes of reducing the overall height of the vehicle and allowing the rear seat occupant room for his feet under the front seat, at a point above the bar 13 to a frame member 36 such as shown in Figure 13. If the rear end of the deck section is attempted to be simply connected to such a frame member 36 the hips or buttocks of the occupant tend to rock forwardly which results in the chafing effect. The occupant of the seat tends to continuously slide forwardly. An attempt was made to solve this problem by using hard rubber hangers having some flexibility to which the rear ends of the deck sections of the springs could be connected, however, such hangers have proven generally unsatisfactory.

Figure 14:
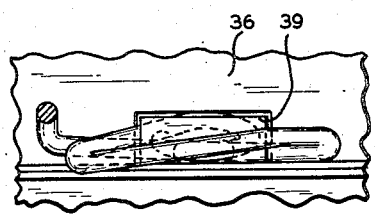
Figure 14 is a front elevational view thereof taken on the line 14—14 of Figure 13.

The novel button hook type end shown in Figures 12–14 lends itself to the multiple staging described and is easy to assemble since it simply snaps into position. Further it permits the rear end of the deck section to move vertically up and down. The rear frame member 36 is shown as having a wall 36a, a wall 36b with longitudinally spaced openings 37 therein and also a flange 36c. The member 36 is supported on frame member 38 and clips 39 are provided in front of the openings 37. The clips 39 have openings 39a for a purpose which will be described.

Instead of the bar 12a of this end of the spring diverging from the bar 12 as previously, it is angled upwardly and has a section 12b which is more extremely angled upwardly than the bar 12. From the section 12b the spring extends substantially horizontally as at 12c and thence is provided with a section 40 similar to the bar 14 of the previous embodiment. Section 40 has joined to it a compound loop or button hook including; a return section 41 which when assembled, and prior to the application of a load, extends above the wall 36b of the rear frame member; a lateral section 42 which angles downwardly; and a section 43 which bears at "x" on flange 36c when the spring is assembled in position and has a loop 44 bearing at "y" on the upper marginal wall of slot 37 and at "z" on the upper marginal wall of slot 39a. When the spring is mounted in position section 40 also bears against the wall 36b but is free to resist the load torsionally.

This end of the spring is preferably preloaded by forming the portion 43 so that it bears against flange 36c at point x and blocks off any deflection of sections 43 and 44 under load. Thus, there need be no concern that the imposition of a load will disengage this spring end from its frame. The spring end then is initially in a first stage which operates to hold the one end of bar 40 and in fact imposes a torsional pretwist on bar 40 because of the preload condition at point x. When a load is applied to the spring, the other end of bar 40 tends to be twisted oppositely and resists the load in torsion. The spring enters stage 2 of its deflection under load when the portion 41 is twisted downwardly into engagement with flange 36c and section 41 resists this deflection as a beam. A third stage of deflection occurs when portion 12c under the load engages flange 36c and stiffens the resistance of the spring considerably because the torsion bar 40 behind it is then blocked out. A fourth and final stage of deflection occurs when the end spacer bar 11 in the deck section is depressed sufficiently to engage torsion bar 13 and block off the supporting end section E′ of the spring entirely. These various stages of deflection can all be preloaded, of course, by varying the relative distances between the various engaging sections of the spring and the portions they engage in the same manner as with the embodiment of the invention previously described. With this design as well as the previous one the contour can be controlled in this manner to provide maximum comfort over a wide range of applied loads. Because the rear end of the spring can deflect vertically there is no chafing as with present constructions.

In Figures 16–19 we have shown a seat spring assembly in which the springs S have front supporting ends or fishmouth sections formed as described when previously referring to Figure 17 and rear supporting ends formed as described when previously referring to Figures 12–14. The frame member 35 to which the front ends of the springs are secured is connected to the frame member 38 which supports the rear ends E' by end frame members 45. The pressed rear frame members 36 are provided as before to support the rear ends of the springs and the ends of the springs and their deck sections are formed exactly as previously described as are the tie wires 29 and 29' which were described previously when referring to Figures 6–11.

The border wire 30 has rear ends 30a which are received in tunnels 46 (see also Figure 13) and has a loop 30b formed in each side section thereof as shown. While we have shown the border wire as generally C shaped with the side sections integrally joined to a front section it may be that it would be desirable to form the border wire in the shape of a rectangle with a rear section. In such a case the rear section tunnels would support the rear section in much the same manner while rigidly preventing its forward and rearward movement and the clips 47 would similarly clip the front section of the border wire 30 to the front end torsion bars in the deck or top sections D of the springs.

We have noted that when a load is applied to the deck sections of the springs S and these sections are deflected into a contour of appropriate form the border wires 30 operate to resist the load. In Figure 19 the normal position of the deck section D of the spring shown in Figure 16 is depicted in solid lines and its deflected position is indicated by the diagrammatic lines. When the deck section D is deflected downwardly its front end torsion bars are moved rearwardly and downwardly and this movement is resisted by the border wire 30 which is clipped to these torsion bars and must move with them. We have discovered that the contour the deck section D will assume can be modified by varying the resistance the border wire 30 will exert. Thus by providing one or more loops in the side sections of the border wire these sections are rendered less rigid since the loops 30b are compressed as indicated by the diagrammatic lines in Figure 18 when a load is applied to springs S. Accordingly, the formation of loops 30b in the side sections of the border wire offer an additional method of controlling the contour which the spring will assume. In this case the frame member (border wire) is preloaded relative to the spring because the loop 30b can be made in any size dependent on the resistance desired or more than a single loop could be employed in each side section of the border wire.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. In a multiple stage spring assembly; a wire spring comprising a deck section having supporting end sections; frame members supporting each of said end sections; means on at least one of said end sections bearing on one of said frame members when a load is applied to said deck section to resist deflection of the spring; and means mounted on said end section normally out of engagement with said frame member when said first means initially engages it, in a later stage of deflection engaging and bearing on said frame member to stiffen it by blocking said first means out of operation.

2. The combination defined in claim 1 in which said first means is preloaded by said frame member to create a stress in said spring resistant to the application of a load to said deck section prior to any load imposition.

3. In a multiple stage spring assembly; a wire spring comprising a sinuous deck section integrally joined to fishmouth supporting end sections; frame members supporting each of said end sections; an integral portion of at least one of said end sections bearing on one of said frame members when a load is applied to said deck section to resist deflection of the spring; and a second integral portion of said end section, out of engagement with said frame member when said first portion initially engages it, in a later stage of deflection engaging and bearing on said frame member to stiffen it by blocking said first means out of operation.

4. In a spring assembly; a wire spring comprising a load application deck section and supporting end sections therefor; front and rear frame members supporting said end sections; the support portion of the rear member being located at a level above the support portion of the front member; and means including the rear end support section formed and secured to said rear frame member in a manner to permit substantially vertical depression of the rear edge of said deck portion under load; said rear end support section including a first bar extending downwardly and inwardly from the rear of the deck section, and a second bar extending angularly therefrom in a reverse direction at a spaced distance below said bar; and said means permitting substantially vertical depression of the rear edge of said deck portion under load including, besides said bars, a section supporting and extending upwardly relative to said second bar, and a loop portion connected to said upwardly extending portion and to said rear frame member.

5. In a spring assembly, a wire spring comprising a load application deck section and supporting end sections therefor, front and rear frame members supporting said end sections, the rear frame member having a rear wall and a bottom wall, the rear wall having a recess, a wall for said rear frame member a spaced distance in front of said rear recess, and a compound loop for the rear supporting end section including a resilient section snapped into place between a marginal wall of said recess and the wall spaced from said recess.

6. In a spring assembly; a wire spring comprising a load application deck section having front and rear supporting end sections from which the deck section is supported; front and rear frame portions supporting said end sections with the rear frame portion spaced rearward from said deck section; the rear supporting end section including a first leg section joined to the rear of said deck section and diverging angularly away therefrom forwardly and downwardly to underlie said deck section; an under portion comprising a rearwardly extending second leg section joined to said first leg section by a torsion section and diverging relative to said first leg section; a rear arm section connecting with said under portion at a point forwardly of and below said rear support surface extending angularly upwardly relative to said second leg section in a direction at an upwardly inclined angle generally back toward said deck section but rearwardly thereof to said rear frame portion; and means fixing said arm section on said rear frame portion to provide a fulcrum about which said arm section can swing, with the front end of said rear arm section providing a yieldable connection swingable in an arc under a load applied to said deck section to permit the rear portion of said deck section to move substantially vertically.

7. In a spring assembly; a wire spring comprising a load application deck section having front and rear supporting end sections from which the deck section is supported; front and rear frame portions supporting said end sections with the rear frame portion spaced rearward from said deck section; the rear supporting end section comprising a first leg section joined to the rear of said deck section and diverging angularly away therefrom forwardly and downwardly to underlie said deck section; an under portion including a rearwardly extending second leg section joined to said first leg section by a torsion section and diverging relative to said first leg section; a rear arm section, having a part thereof connecting with said under portion at a point below said deck section and extending upwardly angularly relative to said second leg section, terminating at a point rearward of said deck section; and means connecting the upper part of said arm section to said rear frame portion so that a support is provided about which said arm section can swing, with the lower end of said rear arm section providing a yieldable connection swingable rearwardly under a load applied to said deck section to permit the rear portion of said deck section to move substantially vertically.

8. In a spring assembly; a wire spring comprising a load application deck section having front and rear supporting ends from which the deck section is supported; front and rear frame sections supporting said ends with the rear frame section spaced rearward from said deck section generally in front to rear alignment with said deck section; the rear supporting end comprising a first leg member joined to the rear of said deck section and diverging angularly away therefrom forwardly and downwardly to underlie said deck section; an under portion including a rearwardly extending second leg member joined to said first leg member by a torsion member and diverging relative to said first leg member; a rear arm member, having a part thereof connecting with said under portion at a point below said deck section and extending upwardly angularly relative to said second leg member, terminating at a point rearward of said deck section; and means connecting the upper part of said arm member to said rear frame section so that a support is provided about which said arm member can swing, with the lower end of said rear arm member providing a yieldable connection swingable rearwardly under a load applied to said deck section to permit the rear portion of said deck section to move substantially vertically.

References Cited in the file of this patent
UNITED STATES PATENTS

| | | |
|---|---|---|
| 2,250,039 | Stackhouse | July 22, 1941 |
| 2,579,970 | Scampone | Dec. 25, 1951 |
| 2,663,360 | Ory | Dec. 22, 1953 |
| 2,740,468 | Gonia et al. | Apr. 3, 1956 |
| 2,803,020 | Walters | Aug. 20, 1957 |
| 2,830,654 | Neely | Apr. 15, 1958 |

FOREIGN PATENTS

| | | |
|---|---|---|
| 506,068 | Belgium | Oct. 15, 1951 |